US008301846B2

(12) United States Patent
Hou

(10) Patent No.: US 8,301,846 B2

(45) Date of Patent: *Oct. 30, 2012

(54) INTEGRATED MEMORY CONTROL APPARATUS

(75) Inventor: Ching-Min Hou, Taichung County (TW)

(73) Assignee: ITE Tech. Inc., Hsinchu (TW)

( * ) Notice: Subject to any disclaimer, the term of this patent is extended or adjusted under 35 U.S.C. 154(b) by 8 days.

This patent is subject to a terminal disclaimer.

(21) Appl. No.: 13/163,747

(22) Filed: Jun. 20, 2011

(65) Prior Publication Data

US 2011/0252175 A1 Oct. 13, 2011

Related U.S. Application Data

(63) Continuation of application No. 12/814,489, filed on Jun. 14, 2010, now Pat. No. 8,024,540, which is a continuation of application No. 11/941,983, filed on Nov. 19, 2007, now Pat. No. 7,818,529.

(30) Foreign Application Priority Data

Sep. 6, 2007 (TW) .............................. 96133220 A

(51) Int. Cl.
*G06F 12/00* (2006.01)

(52) U.S. Cl. ........ 711/147; 711/151; 711/153; 711/163; 711/E12.001; 700/18; 710/241; 710/5

(58) Field of Classification Search ........................ None
See application file for complete search history.

(56) References Cited

U.S. PATENT DOCUMENTS

| | | | | |
|---|---|---|---|---|
| 5,319,783 | A * | 6/1994 | Zink et al. | 700/18 |
| 5,557,783 | A * | 9/1996 | Oktay et al. | 713/401 |
| 2004/0059902 | A1* | 3/2004 | Yeh et al. | 713/1 |
| 2007/0260757 | A1* | 11/2007 | Bueb et al. | 710/5 |
| 2008/0005437 | A1* | 1/2008 | Gupta et al. | 710/241 |

* cited by examiner

*Primary Examiner* — Charles Rones
*Assistant Examiner* — Arvind Talukdar
(74) *Attorney, Agent, or Firm* — Litron Patent and Trademark Office; Min-Lee Teng

(57) ABSTRACT

An integrated memory control apparatus including a first interface decoder, a second interface decoder and an interface controller is provided. Wherein, the first interface decoder is coupled to a control chip through a first serial peripheral interface (SPI), the second interface decoder is coupled to a micro-processor unit through a general transmission interface, and the interface controller is coupled to a memory through a second SPI. When the interface controller receives the request signals from the control chip and the micro-processor unit, the control chip may correctly read data from the memory through the first and second SPI. On the other hand, the micro-processor unit may stop reading data from the memory through the general transmission interface. Therefore, the control chip and the micro-processor unit may share the same memory.

4 Claims, 4 Drawing Sheets

INTEGRATED MEMORY CONTROL APPARATUS

CROSS-REFERENCE TO RELATED APPLICATION

This is a continuation of and claims the priority benefit of application Ser. No. 12/814,489 filed on Jun. 14, 2010, now allowed, which is a continuation of application Ser. No. 11/941,983 filed on Nov. 19, 2007, now U.S. Pat. No. 7,818, 529, which claims the priority benefit of Taiwan patent application serial no. 96133220, filed Sep. 6, 2007. The entirety of each of the above-mentioned patent applications is hereby incorporated by reference herein and made a part of this specification.

BACKGROUND OF THE INVENTION

1. Field of the Invention

The present invention relates to an integrated memory control apparatus. More particularly, the present invention relates to an integrated memory control apparatus for a serial transmission interface.

2. Description of Related Art

Flash memories are commonly used components on main boards of the computers, and are widely applied in personal computers and notebook computers. Various kinds of data may be stored in the flash memory, and therefore South Bridge chips and various kinds application specific integrated circuits (ASICs) disposed on the main board may complete specific instructions by accessing data stored in the flash memory.

FIG. 1 is a block diagram illustrating a part of a conventional main board. Referring to FIG. 1, the conventional main board 100 includes flash memories 110 and 120, a South Bridge chip 130 and an ASIC 140. The ASIC 140 includes a micro-processor unit 141 and a memory controller 142. The South Bridge chip 130 and the ASIC 140 may respectively access the data stored in the flash memories 110 and 120 through the serial peripheral interfaces (SPI) SPI1 and SPI2.

Moreover, the memory controller 142 is used for controlling read and write of the flash memory 120. The micro-processor unit 141 is used for writing the data into the flash memory 120 or reading the data from the flash memory 120 according to an operation of the memory controller 142. During a data transmission, the data transmission between the micro-processor unit 141 and the flash memory 120 is performed via a general transmission interface GTI1. Since the memory controller 142 may transmit a waiting signal to the micro-processor unit 141 through a signal line of the general transmission interface GTI1, the micro-processor unit 141 may timely stop reading of the data from the flash memory 120 in response to the received waiting signal.

However, as to the South Bridge chip 130, the signal line within the serial peripheral interface SPI1 cannot transmit the waiting signal. Therefore, when the South Bridge chip 130 begins to read the data from the flash memory 110 by sending a request signal, a wait state cannot be arbitrarily inserted during data reading of the South Bridge chip 130. In other words, the South Bridge chip 130 and the micro-processor unit 141 of the ASIC 140 cannot share the same flash memory. In this case, fabrication cost of the conventional main board 100 is greatly increased, and a layout area of its printed circuit board will be more complicated, and accordingly, it is highly desirable to simplify and improve the circuit layout of the main board.

SUMMARY OF THE INVENTION

The present invention is directed to an integrated memory control apparatus used for controlling transmitted signals between a memory and a control chip, and between the memory and a micro-processor unit, such that the control chip and the micro-processor unit may share the same memory.

The present invention provides an integrated control apparatus including a first interface decoder, a second interface decoder and an interface controller. The first interface decoder is coupled to a control chip through a first serial peripheral interface (SPI), the second interface decoder is coupled to a micro-processor unit through a general transmission interface, and the interface controller is coupled to the first interface decoder and the second interface decoder, and is coupled to a memory through a second SPI.

It should be noted that the first interface decoder and the second interface decoder are respectively used for decoding received signals. Moreover, when the first interface decoder and the second interface decoder respectively receive request signals from the control chip and the micro-processor unit, the second SPI bridges the signal sent from the first interface decoder under control of the interface controller, and the second interface decoder may transmit a waiting signal output from the interface controller to the micro-processor unit through the general transmission interface, such that the micro-processor unit may stop sending signals to the second interface decoder, and data transceiving of the first interface decoder may not be influenced by the request signals of the micro-processor unit.

In an embodiment of the present invention, a frequency of a clock signal sent from the aforementioned first SPI is smaller than that of the second SPI. Further, the frequency of the clock signal sent from the second SPI is varied with time, so as to link the transmitted signals of the first SPI with that of the second SPI.

Since the first interface decoder and the second interface decoder of the present invention are respectively coupled to the general transmission interface and the SPI, and when the interface controller receives the request signals from the control chip and the micro-processor unit, the control chip may correctly read data from the memory, and the micro-processor unit may stop reading data from the memory. Therefore, the control chip and the micro-processor unit may share the same memory.

In order to make the aforementioned and other objects, features and advantages of the present invention comprehensible, a preferred embodiment accompanied with figures is described in detail below.

DESCRIPTION OF EMBODIMENTS

A main technique feature of the present invention is that two decoders are respectively coupled to a general transmission interface and a serial peripheral interface (SPI), such that an interface controller may receive and arbitrate request signals sent from a control chip and a micro-processor unit. In this case, the control chip coupled to the serial peripheral interface and the micro-processor unit may share a same memory. Examples will be set for to describe an integrated memory control apparatus of the present invention. However, these examples are not intend to limit the scope of the present invention, and it should be understood to those skilled in the art that various modifications and variations can be made to the embodiments of the present invention without departing from the scope or spirit of the present invention.

Before the embodiments of the present invention are described, the memory used for the following description is assumed to be a flash memory, and the control chip is a South Bridge chip. It should be understood by those skilled in the art the memory and control chip of a main board may be renewed along with developing of techniques, and therefore other kinds of control chips and memories may also be applied herein.

Figure 1:
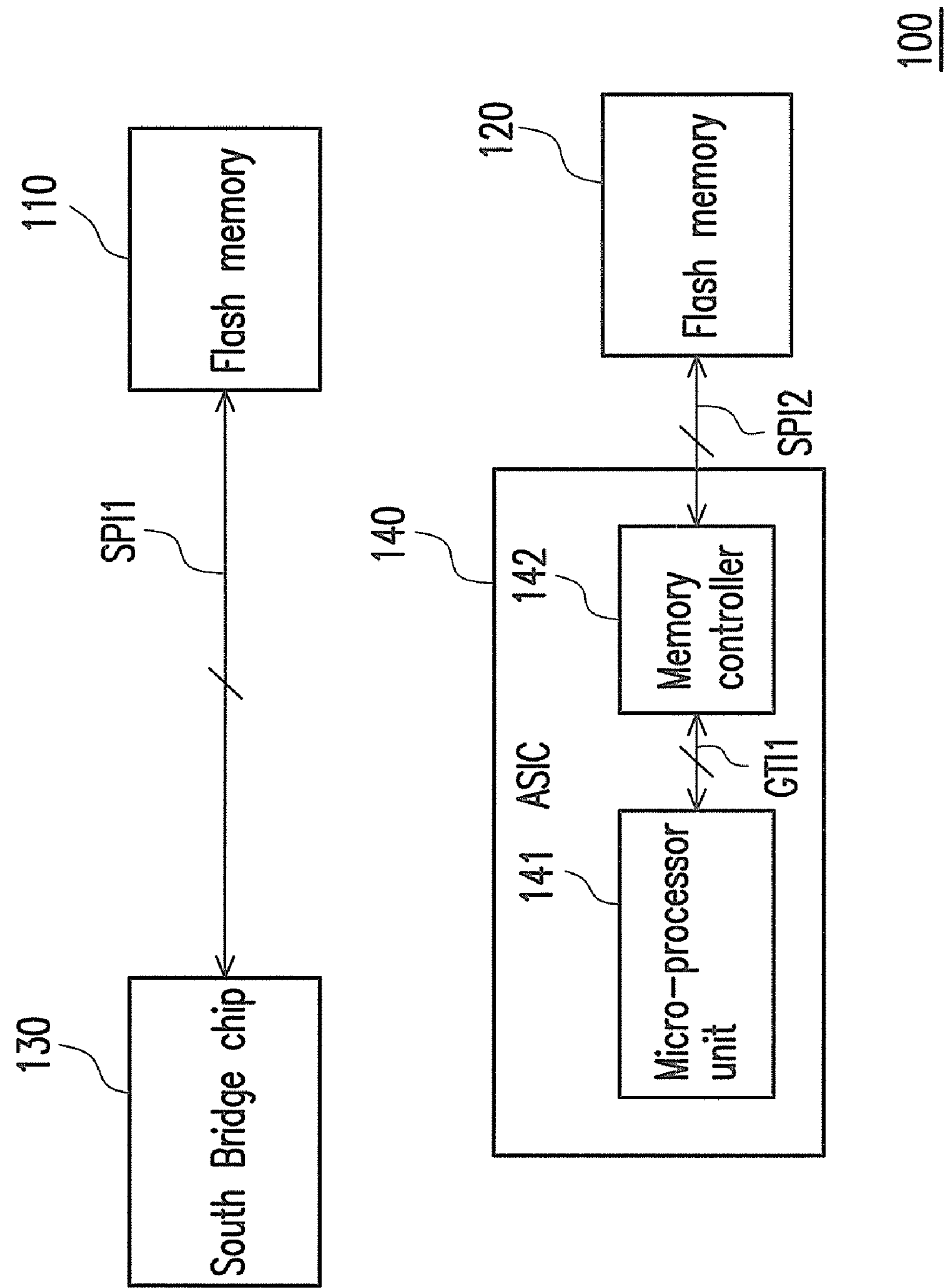
FIG. 1 is a block diagram illustrating a part of a conventional main board.
Figure 2:
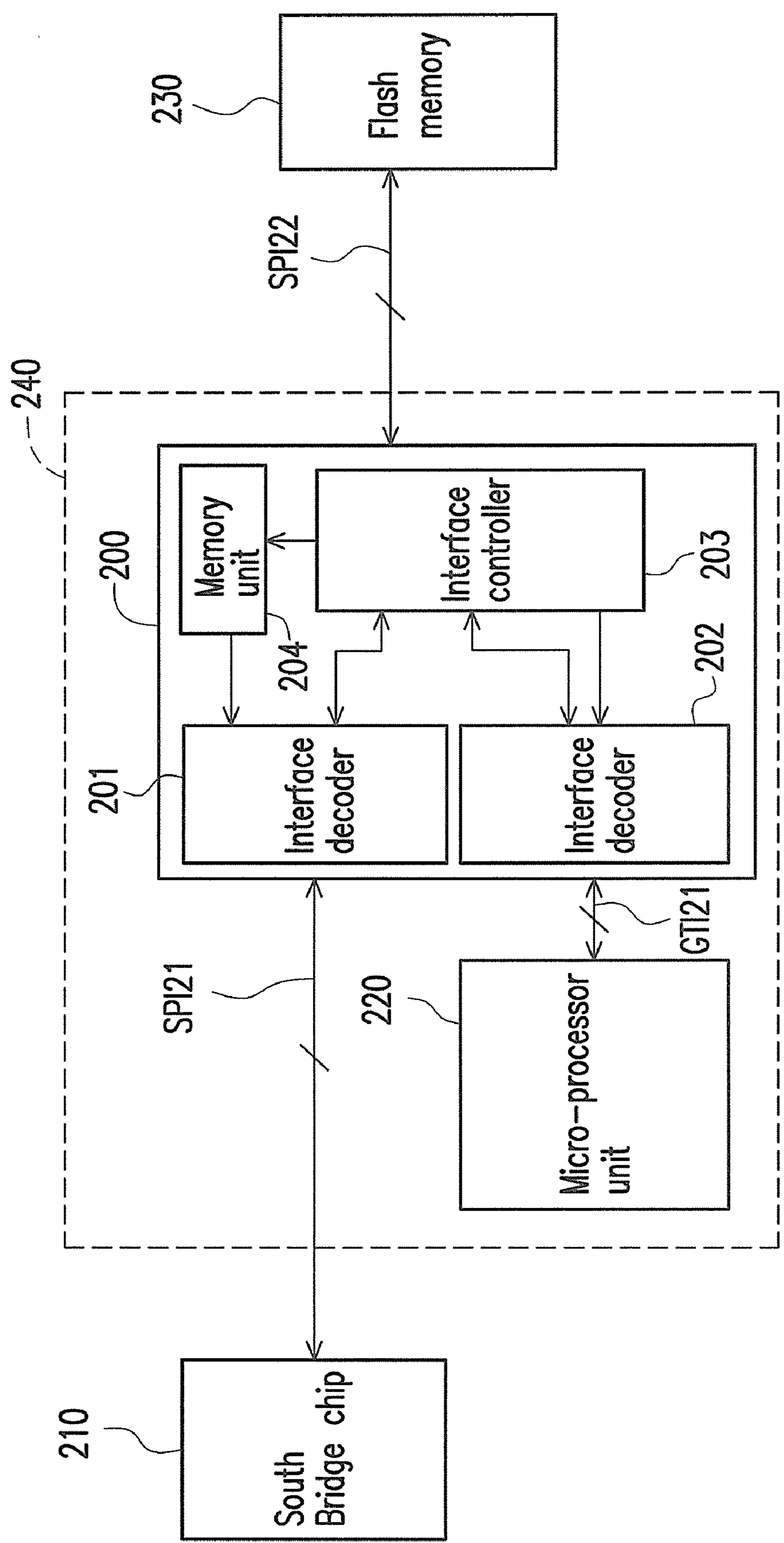
FIG. 2 is a diagram illustrating an integrated memory control apparatus according to an embodiment of the present invention.

FIG. 2 is a diagram illustrating an integrated memory control apparatus according to an embodiment of the present invention. For convenience, a South Bridge chip 210, a micro-processor unit 220 and a flash memory 230 are further illustrated in FIG. 2. Referring to FIG. 2, the integrated memory control apparatus 200 includes interface decoders 201 and 202, an interface controller 203 and a memory unit 204, wherein the interface controller 203 includes an arbiter (not shown). The interface decoder 201 is coupled to the South Bridge chip 210 through a serial peripheral interface SPI21. The interface decoder 202 is coupled to the micro-processor unit 220 through a general transmission interface GTI21. The interface controller 203 is coupled to the interface decoders 201 and 202, and is coupled to the flash memory 230 through a serial peripheral interface SPI22. The memory unit 204 is coupled between the interface decoder 201 and the interface controller 203.

During operation, the interface decoders 201 and 202 are used for decoding the received signals. Therefore, when the South Bridge chip 210 and the micro-processor unit 220 respectively send a request signal for reading data from the flash memory 230, the interface decoders 201 and 202 may decode the request signals to a format that the interface controller 203 may interpret. Now, the arbiter in the interface controller 203 may arbitrate the request signals sent from the South Bridge chip 210 and the micro-processor unit 220. Since the interface decoder 201 has a higher priority than that of the interface decoder 202, the serial peripheral interface SPI22 may bridge the signal sent from the interface decoder 201. Namely, the serial peripheral interface SPI22 may bridge the signal sent from the serial peripheral interface SPI21.

When the flash memory 230 receives the signals sent from the serial peripheral interface SPI21, the flash memory 230 may transmit the data to be read by the South Bridge chip 210 to the interface controller 203. Next, the interface controller 203 may transmit the data sent from the flash memory 230 to the interface decoder 201. By decoding of the interface decoder 201, the South Bridge chip 210 may read the data from the flash memory 230 through the serial peripheral interface SPI21. It should be noted that during data transmission, the interface controller 203 may first temporarily store the data sent from the flash memory 230 into the memory unit 204, and then transmit the data to the interface decoder 201.

On the other hand, the interface controller 203 may send a waiting signal to the interface decoder 202. The interface decoder 202 then decodes the waiting signal and transmits the decoded waiting signal to the micro-processor unit 220 through the general transmission interface GTI21. When the micro-processor unit 220 receives the waiting signal from the interface controller 203, reading of the data from the flash memory 230 will be pended, until the interface controller 203 permits the request signal sent from the micro-processor unit 220.

It should be noted that when the integrated memory control apparatus 200 and the micro-processor unit 220 are simultaneously disposed in an application specific integrated circuit (ASIC) 240, the micro-processor unit 220 of the ASIC 240 and the South Bridge chip 210 may share the same flash memory 230. Therefore, compared to a conventional technique, the main board applying the integrated memory control unit 200 of the present invention may integrate the memories within the main board, so as to effectively decrease a fabrication cost and facilitate a circuit layout.

To further describe the scope of the present invention, the serial peripheral interface with a standard specification is taken as an example to further describe the integrated memory control apparatus 200. In this case, an embodiment of FIG. 3 is provided along with a timing diagram of FIG. 4 to demonstrate the transmitted signals of the serial peripheral interfaces SPI21 and SPI22.

Figure 3:
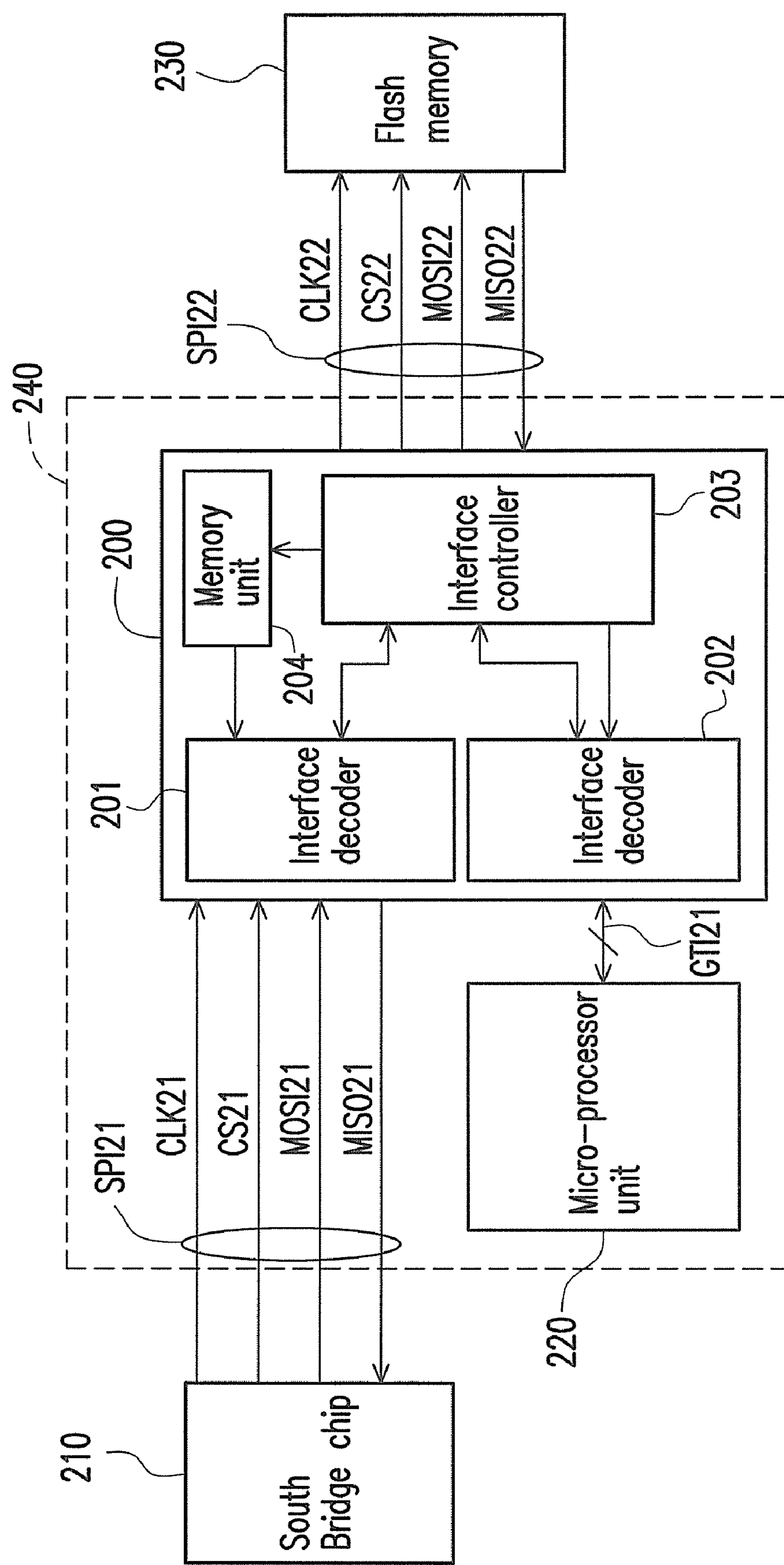
FIG. 3 is a diagram illustrating an integrated memory control apparatus having a serial peripheral interface structure with a standard specification.
Figure 4:
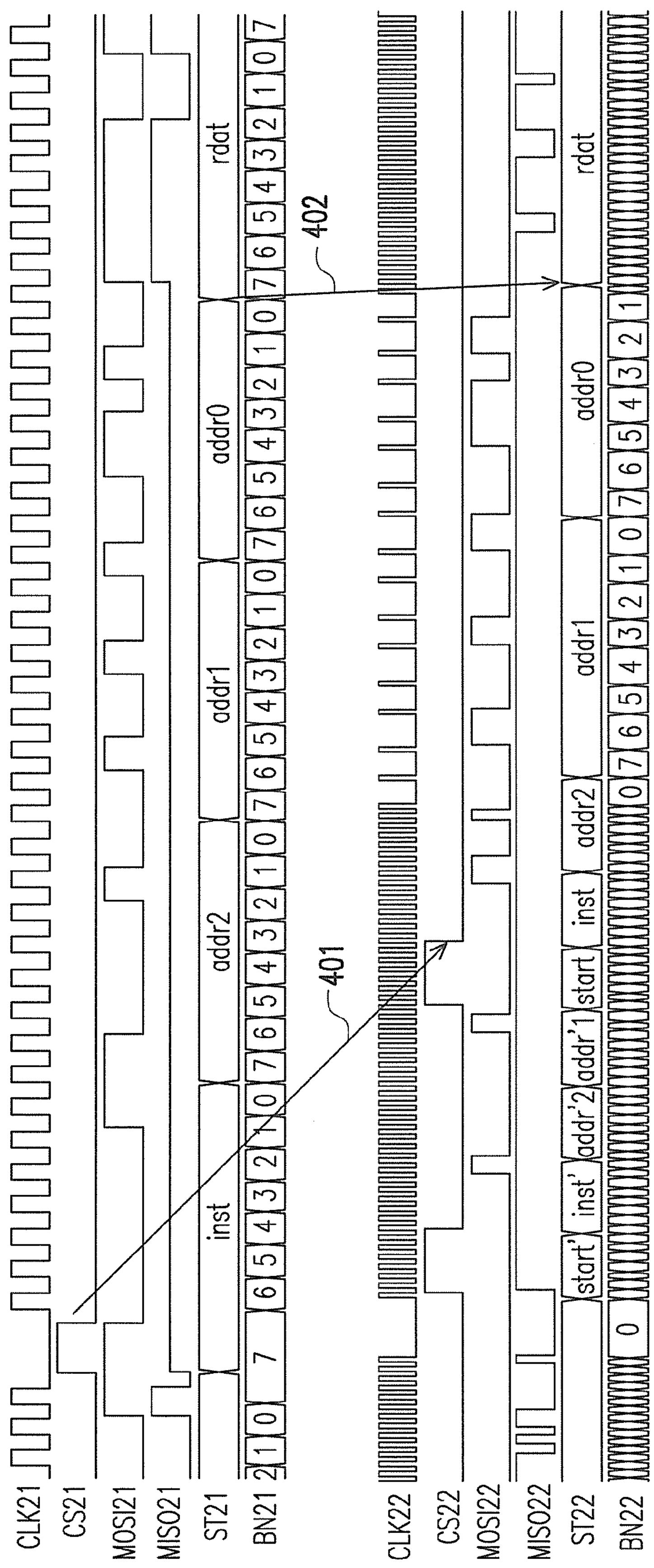
FIG. 4 is a timing diagram for demonstrating the embodiment of FIG. 3.

Referring to FIG. 3 and FIG. 4, the serial peripheral interface SPI21 includes 4 signal lines, respectively used for transmitting a clock signal CLK21, an enable signal CS21, a master-in-slave-out signal MISO21 and a master-out-slave-in signal MOSI21. Similarly, the serial peripheral interface SPI22 also includes 4 signal lines, respectively used for transmitting a clock signal CLK22, an enable signal CS22, a master-in-slave-out signal MISO22 and a master-out-slave-in signal MOSI22.

In addition, a signal ST21 is used for representing a data state of the serial peripheral interface SPI21, and a signal BN21 is used for representing a bit-order of the signal ST21. For example, the addr2~addr0 for representing a start address of the data respectively have 8 bits. Moreover, a signal ST22 is used for representing the data state of the serial peripheral interface SPI22, and a signal BN22 is used for representing the bit-order of the signal ST22.

During operation, when a logic level of the enable signal CS21 is switch from a high level to a low level, it represents the South Bridge chip 210 is sending a request signal to the flash memory 230. Then, the South Bridge chip 210 may sequentially generate an instruction inst and the start addresses addr2~addr0 of the data. Wherein, the instruction inst indicates that the South Bridge chip 210 requests a reading cycle for reading the data from the flash memory 230, and the generated signals by the South Bridge chip 210 may be transformed into the master-out-slave-in signal MOSI21 in the serial peripheral interface SPI21, so as to transmit the generated signals to the interface controller 203 through the interface decoder 201.

It should be noted that before the interface controller 203 receives the request signals from the South Bridge chip 210, the arbiter therein may not be in an idle state. Namely, the arbiter may have permitted the request signal sent from the micro-processor unit 220, such that the serial peripheral interface SPI22 controlled by the interface controller 203 may be bridging the instruction inst' and the start addresses addr'2~addr'1 of the data sent from the micro-processor unit 220.

However, when the interface controller 203 receives the request signal sent from the South Bridge chip 210 through the interface decoder 201, the arbiter of the interface controller 203 may arbitrate the request signals sent from the South Bridge chip 210 and the micro-processor unit 220. Since the request signal sent from the South Bridge chip 210 has a highest priority, the arbiter of the interface controller 203 permits the request signal sent from the South Bridge chip 210. Then, as shown by an arrow 401 in FIG. 4, the interface controller 203 may again switch the logic level of the enable signal CS22, such that the serial peripheral interface SPI22 may bridge the instruction inst and the start addresses addr2~addr0 of the data sent from the South Bridge chip 210. In other words, the serial peripheral interface SPI22 is used for bridging the signals sent from the interface decoder 201.

On the other hand, the interface controller 203 may send a waiting signal to the interface decoder 202. The interface decoder 202 then decodes the waiting signal and transmits the decoded waiting signal to the micro-processor unit 220 through the general transmission interface GTI21. When the micro-processor unit 220 receives the waiting signal from the interface controller 203, reading of the data from the flash memory 230 performed by the micro-processor unit 220 will be pended.

Furthermore, during data transmission of the serial peripheral interfaces SPI21 and SPI22, since a frequency of the clock signal CLK21 sent from the serial peripheral interface SPI21 is small than the frequency of the clock signal CLK22 sent from the serial peripheral interface SPI22, the serial peripheral interfaces SPI21 and SPI22 may almost simultaneously complete transmission of the instruction inst and the start addresses addr2~addr0 sent from the South Bridge chip 210, as shown of an arrow 402 of FIG. 4. Further, the frequency of the clock signal CLK22 sent from the serial peripheral interface SPI22 is varied with time. Therefore, the time points for the serial peripheral interface SPI22 transmitting the instruction inst and the start addresses addr2~addr0 may correspondingly fall behind the time points for the serial peripheral interface SPI21 transmitting the instruction inst and the start addresses addr2~addr0.

In other words, the interface controller 203 may complete reading of the data from the flash memory 230 faster than that of the South Bridge chip 210, such that the serial peripheral interface SPI22 may correctly receive the signals from the serial peripheral interface SPI21. Accordingly, the South Bridge chip 210 may read the data from the flash memory 230 through the serial peripheral interface SPI21. It should be noted that when the interface controller 203 finishes reading data from the flash memory 230, the interface controller 203 may re-arbitrate the received request signals so as to permit the request signal sent from the micro-processor unit 220.

On the other hand, when the flash memory 230 retains the data rdat to be read by the South Bridge chip 210 according to the received instruction inst and the start addresses addr2~addr0, the serial peripheral interface SPI21 may also correctly receive the signals sent from the serial peripheral interface SPI22, and the South Bridge chip 210 may read the data rdat from the flesh memory 230.

In summary, two interface decoders of the present invention are respectively coupled to the general transmission interface and the serial peripheral interface. When the interface controller receives the request signals from the control chip and the micro-processor unit, the control chip may correctly read data from the memory, and the micro-processor unit may stop reading data from the memory according to the waiting signal. Therefore, the control chip coupled to the serial peripheral interface and the micro-processor unit may share a same memory.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An application specific integrated circuit, coupled between a control chip and a memory, for controlling signals transmitted between the memory and the control chip, the application specific integrated circuit comprising:

a micro-processor unit;

a first interface decoder, coupled to the control chip through a first interface comprising a first clock, configured to decode received signals;

a second interface decoder, coupled to the micro-processor unit through a transmission interface, configured to decode the received signals; and an interface controller, coupled to the first interface decoder and the second interface decoder, and coupled to the memory through a second interface comprising a second clock, wherein the control chip requests a reading cycle for reading data, comprising a plurality of address bits, from the memory through the first interface decoder when the micro-processor unit is reading data from the memory, and then the interface controller bridges the address bits sent from the first interface to the second interface, and wherein time points for bridged address bits on the second interface is operated to correspondingly fall behind time points for the address bits on the first interface in the reading cycle.

2. The application specific integrated circuit as claimed in claim 1 further comprising:

a memory unit, coupled between the first interface decoder and the interface controller, configured to store data output from the memory.

3. The application specific integrated circuit as claimed in claim 2, wherein the memory unit comprises a static random access memory.

4. The application specific integrated circuit as claimed in claim 1, wherein the control chip is a South Bridge chip.

* * * * *